Feb. 1, 1949.  P. D. WURZBURGER  2,460,666
FITTING
Filed Aug. 7, 1944
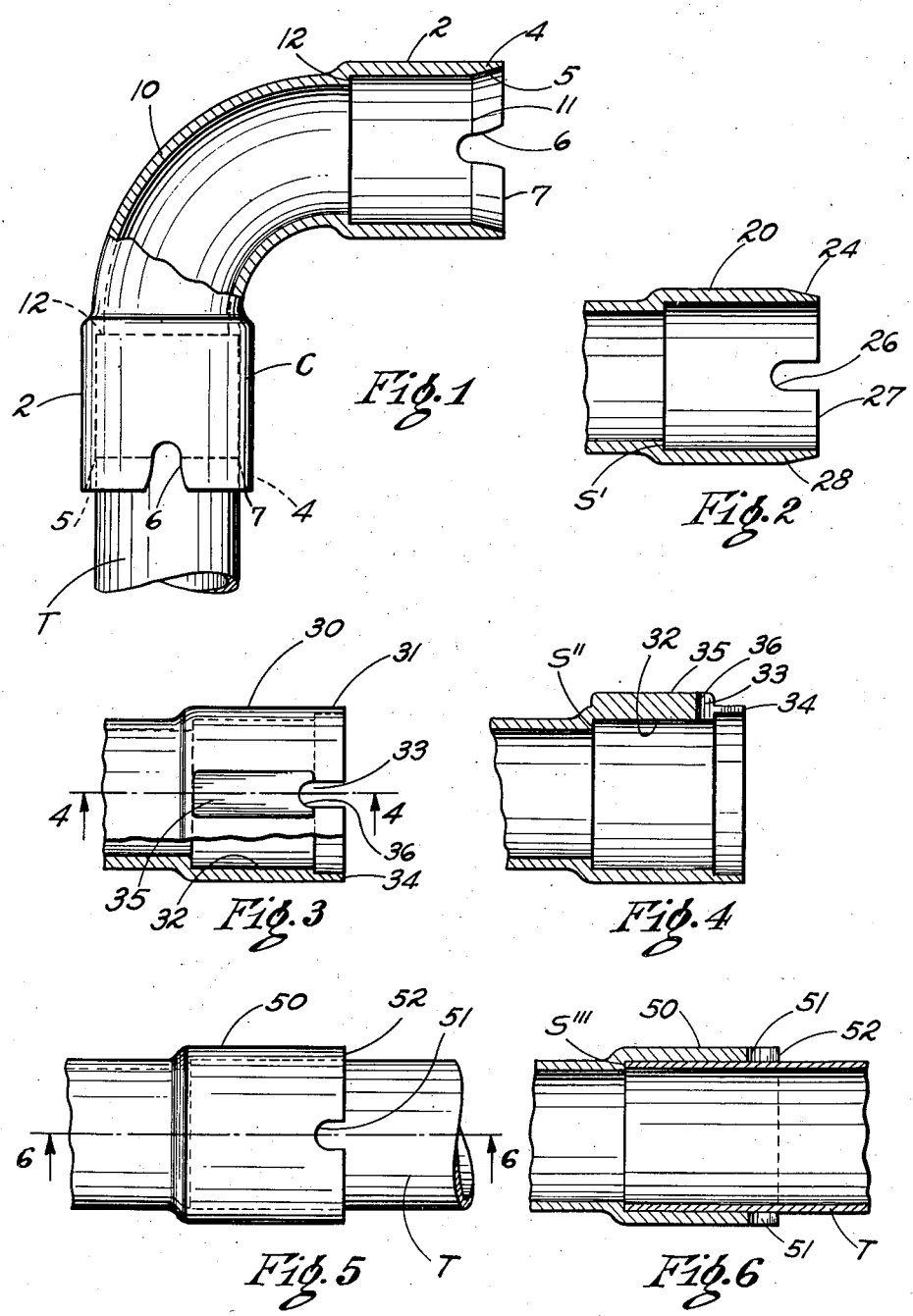
INVENTOR.
PAUL D. WURZBURGER
BY
ATTORNEYS Patented Feb. 1, 1949

2,460,666

UNITED STATES PATENT OFFICE 2,460,666

FITTING

Paul D. Würzburger, Cleveland Heights, Ohio

Application August 7, 1944, Serial No. 548,327

4 Claims. (Cl. 285—115)

This invention relates to the art of making soldered bonded socket joints of the type in which an entering member telescopingly enters a socket, said socket and said entering member having therebetween a capillary space into which solder or other bonding or brazing material may be introduced and/or distributed by capillary action. More particularly this invention has to do with improvements in the socket parts of such joints, through the construction and operation of which, in coaction with the telescopically received tube or member, better introduction, distribution and retention of the solder or other bonding material is provided and more efficient bonding and joining of the parts is obtained. This application is a continuation in part of my copending application Serial Number 544,061, filed July 8, 1944. Reference is also made to my copending applications Serial Numbers 559,171 and 559,172 both filed October 18, 1944, in which common and/or related subject matter is contained.

I found that when bonding material like solder is introduced at the outer edge of the socket, there is a poor contact between the edge of the socket and the solder, especially when the outer extremity of or entrance to the socket has its inside or outside tapered or reduced in thickness. Furthermore such a reduced portion at the open end of the socket will cool more rapidly than thicker portions thereof which, while helpful for retaining solder in the capillary space within the socket, presents a very unfavorable condition for introducing solder or other bonding material to the capillary space from the open end of the socket. Similarly such a condition militates against the proper initial wetting and/or melting of the bonding material and inhibits the distribution and desired function thereof within the capillary space. Whether the open end of the socket be tapered or reduced in thickness or not, the end of the socket or its so-called line of juncture with the adjacent surface of the tube has been a disadvantageous place to introduce bonding material to the capillary space in many respects except in the matter of accessibility. Where the open end of the socket is merely the circular terminus of a relatively thin cylindrical wall of substantially uniform thickness there has always been difficulty in maintaining proper contact between a solder rod and any particular point on the wall of the tube or end of the socket, and there is always a strong tendency to cool the limited adjacent mass and area of the wall of the socket before the solder is fully introduced and distributed.

It is among the objects of my invention to preserve the advantage of accessibility of feeding solder or other bonding material adjacent the open end of the socket; to eliminate the disadvantage heretofore attending such practice to preserve the advantage of cooling the zone adjacent the open end of the socket and to eliminate the concomitant disadvantages heretofore attendant thereto. My objects also include the provision of means to facilitate the introduction of solder or other bonding material both thermally and mechanically and to enhance its distribution and bonding and sealing effects within the capillary space. It is also among the objects of my invention to provide a fitting having the foregoing advantages that may be economically manufactured and will be saving of time and material in use.

Other objects and advantages will appear from the following description of certain preferred forms and embodiments of my invention, reference being had to the accompanying drawings, in which Figure 1 is a partially longitudinally sectioned view of an elbow fitting embodying one form of my invention; Figure 2 is a longitudinal section of the socket part of a fitting embodying my invention in a different form; Figure 3 is a partially longitudinally sectioned view of a side elevation of a fitting having another form of socket part embodying my invention; Figure 4 is a section taken along the lines 4—4 of Figure 3; Figure 5 is an elevation of another form of my invention showing the socket part of the fitting receiving the tube or member telescopically therein, and Figure 6 is a section taken along the line 6—6 of Figure 5.

In Figure 1 I have illustrated an elbow 10 embodying my invention with sockets 2 for receiving telescopically an entering member or tube 3. The sockets 2 and the tube 3 have therebetween a capillary space C of such well known magnitude that it will cause capillary action and attraction on bonding material in liquid or mushy form that is properly introduced thereto. The open end portions 4 of the sockets 2 are thinned out with an inside taper 5. The space between the inside taper 5 and the outside surface of the entering tube 3 is or quickly becomes along the taper 5 of greater than capillary magnitude whereby to terminate the capillary space at about the line of terminus of the taper as at 11 interiorly of the outer edge 7 of the end portion 4 of the socket. Preferably the sockets terminate interiorly in shoulders 12 against which the ends of the tubes 3 may abut. When the tube is received in the socket the capillary space takes cylindrical form between the line 11 and the shoulder 12.

To introduce the solder or other bonding material, which often is conveniently used in rod or stick form, solder and other bonding or brazing materials all being hereinafter referred to as solder, to the capillary space I provide a notch, aperture or indentation 6 cut through the wall of the socket 2 and extending through the part 4 and terminating in a rounded blind end within that part of the socket wall that is of full depth or thickness. One or more notches may be formed or cut in the ends of each sockets, depending in part on the form of the fitting since T's or elbows, for example, may be in positions where notches on one side only of the fitting might be awkward of access. As shown in Figure 1, the sides of the notch 6 are flared outwardly to aid in guiding the solder rod in its entrance into the notch and guiding the end of the rod to the blind terminal end thereof. Preferably the width of the notch adjacent the terminal end thereof is about equal to the diameter of the solder rod to be employed so that the end of the rod will be warmly and closely received at the end of the notch and heat will be transmitted to the solder rod by direct contact with the wall of the socket for about 180° around the rod. It will be noted that the notch 6 extends from the outside edge 7 through the reduced socket portion 4 past the non-capillary space 5 into the body of the socket portion 2 and within the general capillary area behind the line 11.

When a joint is to be made, the operator heats the socket 2 with a proper source of heat, like a torch, and the solder is introduced to the capillary space C through the feeding notch 6. As the solder wire or rod will fit with the shape of the notch 6 extending into the portion of full thickness of the socket with which it makes a good surface contact, the heat accumulated in the socket will be transmitted rapidly to the solder which will melt and spread into the joint under the influence of capillary attraction. No solder will flow by capillary attraction outside the socket into the space 5, but the end portion 4 will be able to contribute heat to the parts of the socket adjacent the notch and aid in the melting and distribution of solder to that extent. When the capillary space C is full a little solder may have worked outwardly beyond the line 11, either adjacent to or remote from the notch 6, but such solder will be concealed from view under the screen of the part 4 so that the joint will have an exceptionally clean external appearance and the need of wiping or cleaning the parts externally will be much reduced or eliminated.

In Figure 2 I have shown a modified form of my invention. The socket 20 for receiving telescopically and in capillary relation a member or tube, not shown, has its end portion reduced, but instead of being tapered inside as shown at 5 in Figure 1, is tapered externally as shown at 24. The notch 26 will extend from the outside edge 27 into the portion of full wall thickness 28 of the socket 20. While this embodiment of my invention does not have a portion of non-capillary attraction at the entrance or open end of the socket 20 as described for the socket 2 of Figure 1, it does through the reduced thickness in the end portion 24 tend to cool most rapidly at its edge 27, but the advantage of this edge cooling does not militate against the advantageous introduction of solder at the closed end of the notch 26 adjacent the hot terminal sides thereof where heat is available from the full wall thickness of the wall of the socket. Here the notch 26 is shown with its walls parallel and preferably spaced apart substantially the diameter of the solder rod to be introduced thereinto. Otherwise the socket 20 may be similar to the socket 2 with an internal shoulder S', and it will be understood that the socket 20 is illustrative of the socket part of any form or kind of a fitting whether straight, T, elbow or otherwise.

In Figures 3 and 4 I have shown a further modification of my invention. The socket 30 has an end portion 31 of reduced thickness which instead of being provided with an inside or outside taper, as shown in Figures 1 and 2, has a substantially cylindrical inner surface spaced more than a capillary distance from the surface of the tube or member, not shown, that will enter the socket 30 in capillary telescoping relation to the interior cylindrical surface 31 as far as the internal shoulder S''. A feeding notch 33 is cut in the socket 30 which extends from the outer front edge 34 of the socket 30 through the portion 31 of non-capillary attraction into the portion of capillary attraction 32. The socket 30 is also provided with a thickened wall portion or rib 35 which is thicker than the full thickness of the other parts of the wall of the socket and which encompasses at least the terminal end of the feeding notch 33. The rib or thickened portion 35 will absorb proportionately greater amounts of heat than the adjacent parts of the socket which heat will be available to be transmitted to the solder when the solder is introduced in the notch 33. Thus an increased amount of heat is provided for melting the solder and completing the joint, and an increased surface area at the terminus of the notch as at 36 is provided for contact with and conduction of heat to the solder. The thickened portion 35 is shown in Figures 3 and 4 as an integral raised rib extending lengthwise on a limited circumferential portion of the outer surface of the socket. As illustrated and described more fully in my copending application Serial No. 544,061, filed July 8, 1944, the rib or thickened portion 35 may take other forms and may extend to the outer edge 34 provided preferably that the portion of the notch 33 which receives the solder wire or rod extends clear through the part 34 and terminates well within the full thickness of the rib and well into the zone of capillary clearance between the socket and the tube.

In Figures 5 and 6 I have illustrated a further modification and embodiment of my invention in which the socket part 50 of an illustrative fitting, receiving the tube or member T to be joined therewith in a capillary bond as characteristic of the several forms of fittings herein mentioned, has neither thickened nor reduced portions but rather has its wall of uniform thickness throughout with preferably a characteristic internal shoulder S''' against which the end of the tube T may abut. In this form of my invention I provide a notch or notches 51 which extend inwardly from the open end or edge 52 of the socket a distance approximating the width of the notch which in turn may approximate the diameter of the solder rod that is to be received therein. For the reasons mentioned above the internal or blind end of the notch 51 may be substantially semi-cylindrical in form whereby to present a wall having substantially semi-cylindrical contact with the solder rod or wire. When the parts are assembled, as shown in Figures 5 and 6, the exposed edge of the capillary space will take substantially annular cylindrical form except where it follows the line of juncture of the notch or notches with the exterior surface of the tube. In the forms of Figures 5 and 6 as well as in the other forms the exposed edge of the capillary space or line of juncture will follow the contour of the notch inwardly whereby the solder can be introduced and fed to the capillary space inwardly of its circumferentially disposed edge whether that edge be coincident with the open of the socket as shown in Figures 2, 5 and 6 or spaced inwardly thereof as shown in Figures 1, 3 and 4.

In all the forms of my invention I take advantage of the desirability of accessibility of introducing the solder to the capillary space adjacent the open end of the socket, but I avoid the dilemma and previously existing contradiction of being thereby compelled to feed the solder at a point of mechanical and thermal disadvantage. The provision of the notch extending inwardly of the open end or edge of the socket not only eliminates the mechanical difficulty of locating the end of the solder rod but also facilitates the rapid transmission of heat from the body of the socket to the solder, and affords to the molten or fluid solder a large entrance area to the capillary space along the extended line of juncture within the notch. It will also be appreciated that I retain the advantages of having a cooling zone or a non-capillary zone immediately adjacent the open end of the socket, and by causing the notch to extend therethrough I overcome the disadvantage of trying to feed solder through a cooling zone into the warmer interior zone of the body of the socket.

While I have illustrated only the elbow form of a complete fitting including the socket parts thereof with which my invention is principally concerned, it will be understood that my invention and the socket parts of the fittings in which the same are embodied in one or more of the forms herein specifically described may be contained in any kind or form of fitting whether straight union or coupling, valve body, adapters, T's or crosses or otherwise, as those skilled in the art will readily appreciate. Similarly the number of notches and the relative disposition of one or more notches around the open edge or open end of the socket part may be varied at will in relation to the other characteristics of the fitting or body with which the socket part is associated. Thus two notches may be disposed diametrically opposite, as shown in Figure 6, or may be spaced 90° from each other if the latter disposition would lend greater accessibility or utility to the practice and enjoyment of my invention. While I contemplate that in fittings of the smaller sizes the solder or bonding material may be fed into the capillary space in a single operation through one feeding notch, still it is not without my teaching and experience with the larger sizes of fittings that the feeding of the solder or bonding material may be enhanced either by feeding through two or more notches in one socket simultaneously or successively.

While I have illustrated and described preferred forms and embodiments of my invention, modifications, changes and improvements may occur to those skilled in the art without departing from the principles and precepts thereof, and I do not care to be limited in the scope of my patent to the preferred forms herein illustrated and described or in any manner other than by the claims appended hereto.

I claim:

1. A fitting for a capillary solder type joint having a socket part adapted to receive a tube or member in telescoping relation with capillary space between the adjacent surfaces thereof into which solder or other bonding material may be fed to unite said surfaces; said socket part having an open end at or adjacent to which said capillary space terminates in an exposed substantially annular edge and said socket part having at least one solder feeding notch extending longitudinally inward from said open end through the wall of said socket part and terminating interiorly of said edge of said capillary space and defining an inwardly protruding contour in the edge of said capillary space through which solder may enter said capillary space, said socket part having a portion adjacent its open end defining a non-capillary space with the tube or member to be received therein outwardly of said edge of said capillary space and said socket having a heat absorbing rib extending inwardly of said edge of said capillary space into the zone of said capillary space, and said notch traversing said portion and extending into said rib.

2. A fitting for a capillary joint having a socket adapted to receive a tube or member in telescoping relation with capillary space between the wall of the socket and the adjacent surface of the said tube or member into which solder or other bonding material may be fed to unit said surfaces, a substantial part of said wall having full substantially uniform thickness, said socket part having an open end at or adjacent to which said capillary space terminates in an exposed edge and said socket part having at least one solder feeding notch extending longitudinally inward from said open end to a part of said wall having a thickness at least as great as said first named part and terminating interiorly of said open end of the socket and defining an inwardly protruding continuous contour in prolongation of the edge of said capillary space through which solder may enter said capillary space, the notch being adapted to receive and embrace a rod or wire of solder to facilitate the melting thereof therein and the capillary flow of molten solder through said contour into the said capillary space.

3. The fitting according to claim 2 in which said socket has a rib or thickened wall portion into which said notch extends, said thickened portion having greater mass and heat capacity per unit of wall area than said first named part of the wall of the socket.

4. A fitting according to claim 2 in which said socket part has an externally raised rib extending longitudinally from adjacent said notch substantially the whole longitudinal extent of said capillary space.

PAUL D. WURZBURGER.

REFERENCES CITED

The following references are of record in the file of this patent:

UNITED STATES PATENTS

| Number | Name | Date |
|---|---|---|
| 1,866,857 | Lindquist | July 12, 1932 |
| 1,931,666 | Lindquist | Oct. 24, 1933 |
| 2,050,728 | Ost | Aug. 11, 1936 |
| 2,083,528 | Burkart | June 8, 1937 |
| 2,166,078 | Stephenson | July 11, 1939 |